United States Patent
Fallis, III et al.

(10) Patent No.: US 7,367,615 B1
(45) Date of Patent: May 6, 2008

(54) MODULAR SLIDING RIGID PANEL ROOF SYSTEM

(75) Inventors: Robert E. Fallis, III, Rochester, MI (US); Michael T. Willard, Harrison Township, MI (US); Robert D. Wiechowski, Warren, MI (US)

(73) Assignee: Magna Car Top Systems GmbH, Rochester Hills, MI (US)

( * ) Notice: Subject to any disclaimer, the term of this patent is extended or adjusted under 35 U.S.C. 154(b) by 0 days.

(21) Appl. No.: 11/758,784

(22) Filed: Jun. 6, 2007

(51) Int. Cl.
  *B60J 7/047* (2006.01)
(52) U.S. Cl. .............. 296/220.01; 296/26.09; 296/216.01; 296/216.04
(58) Field of Classification Search ............ 296/26.08, 296/26.09, 147, 220.01, 216.01, 216.04, 296/216.07, 216.08, 106
See application file for complete search history.

(56) References Cited

U.S. PATENT DOCUMENTS

| | | |
|---|---|---|
| 3,158,397 A | 11/1964 | Peras |
| 3,419,304 A | 12/1968 | Sangimino |
| 6,517,135 B2 | 2/2003 | de Gaillard |
| 6,588,824 B2 | 7/2003 | Neubrand |
| 6,641,201 B1 | 11/2003 | Pietryga et al. |
| 6,726,275 B2 | 4/2004 | Schrans |
| 6,729,074 B1 | 5/2004 | Huisman et al. |
| 6,742,829 B2 | 6/2004 | Reihl |
| 2001/0040394 A1 | 11/2001 | DeGaillard |
| 2002/0008396 A1 | 1/2002 | DeGaillard |
| 2002/0079718 A1 | 6/2002 | Neubrand |
| 2003/0127883 A1 | 7/2003 | Antreich |
| 2003/0164622 A1 | 9/2003 | DeGaillard |
| 2004/0007902 A1 | 1/2004 | Manders et al. |
| 2004/0090092 A1 | 5/2004 | deGaillard et al. |

*Primary Examiner*—Lori L. Lyjak
(74) *Attorney, Agent, or Firm*—Brooks Kushman P.C.

(57) ABSTRACT

A retractable roof assembly for a vehicle is provided that includes relatively movable rigid panels that are positioned to cover a passenger/cargo compartment of the vehicle in an extended position and that are stacked one above another in a retracted position. A telescoping track is provided on opposite lateral sides of the vehicle to guide movement of the roof panels. D-pillars of the roof assembly are slidable between a position wherein they are spaced from the C-pillars to a retracted position in which the D-pillars are adjacent to the C-pillars. Side windows of the vehicle are retracted into the rear quarter panel area of the vehicle.

15 Claims, 4 Drawing Sheets

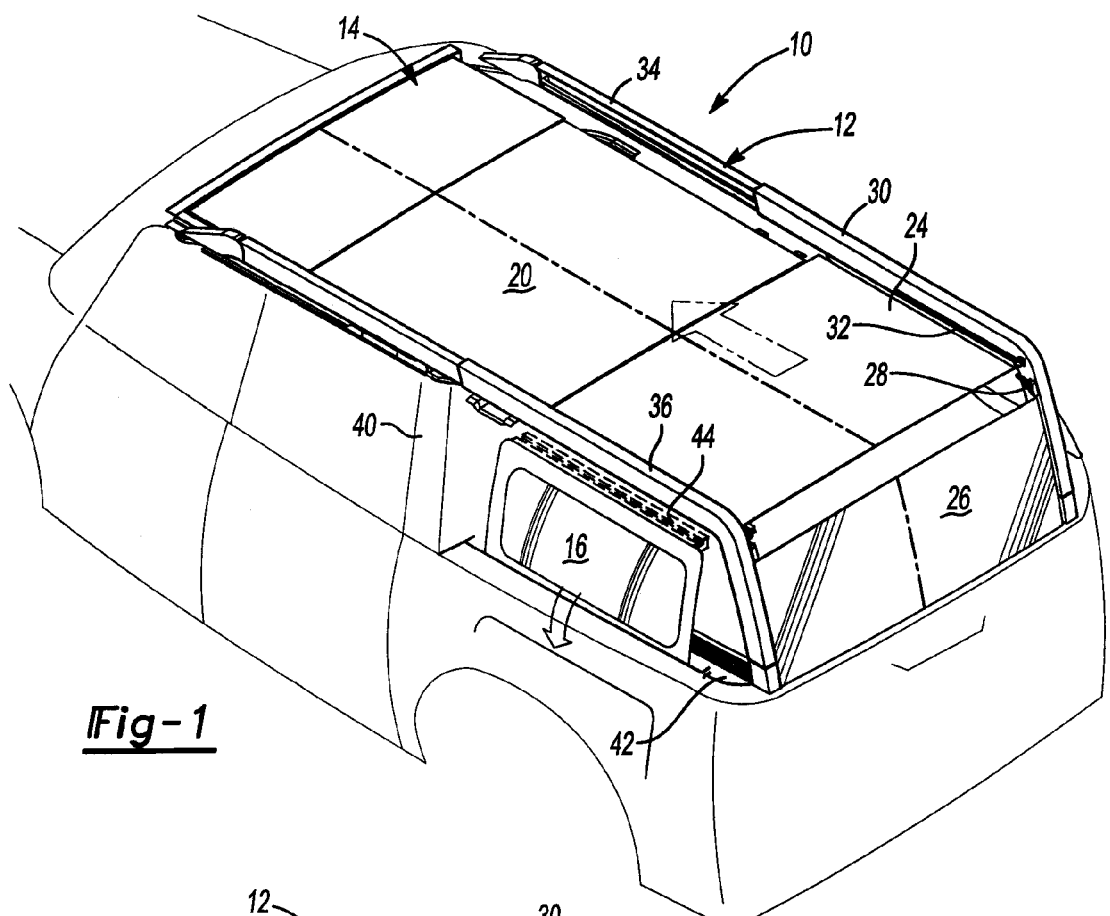
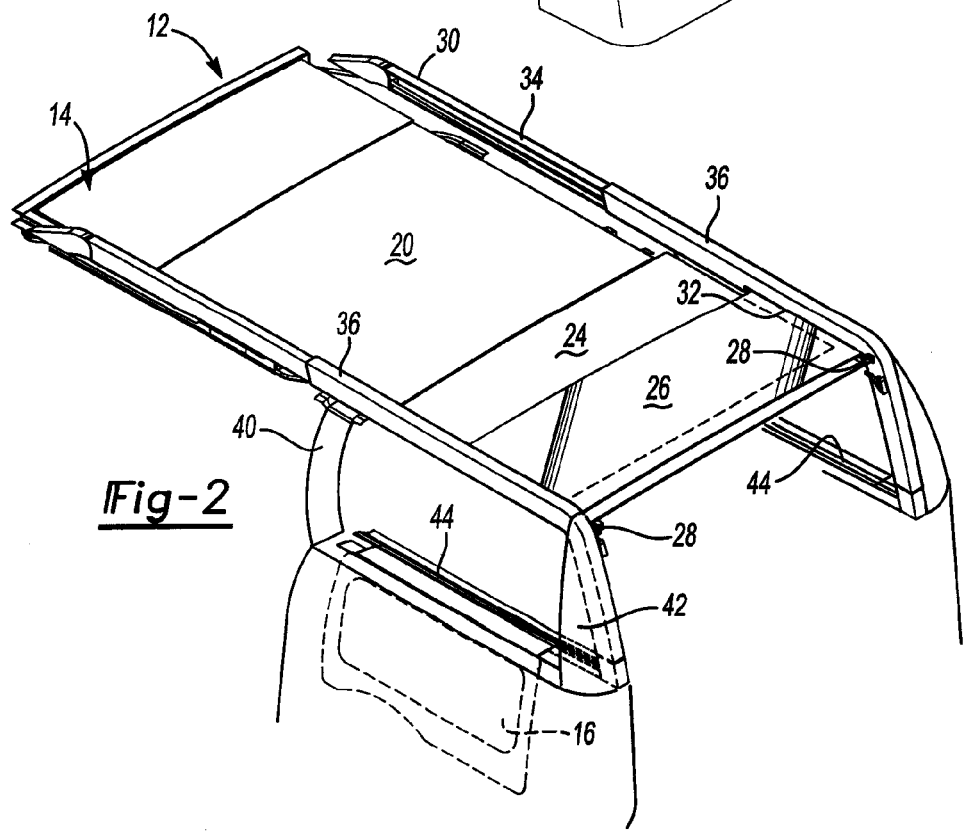

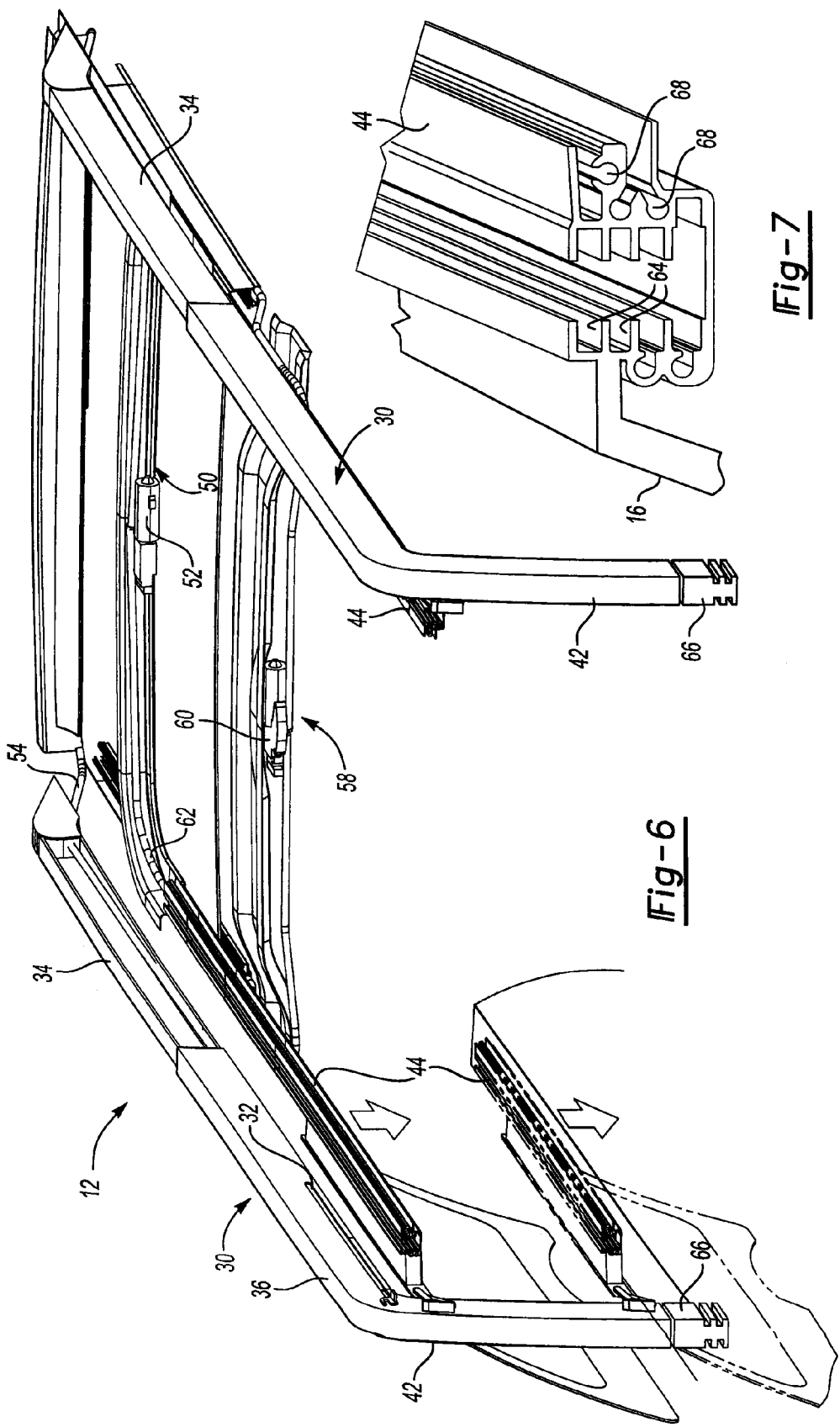

US 7,367,615 B1

MODULAR SLIDING RIGID PANEL ROOF SYSTEM

BACKGROUND OF THE INVENTION

1. Field of the Invention

The present invention relates to a partially retractable roof for a vehicle.

2. Background Art

Retractable roofs and convertible tops are generally designed for sedan or coupe style vehicles. Sport utility vehicles have been provided with removable rigid roofs and snap-on or detachable soft tops that may be manually removed from rigid supports that surround the passenger compartment of the vehicle. Sport utility vehicles and vans may have sunroofs that provide a small open area but generally fail to provide any openings for the rear portion of the passenger compartment.

Vehicles are generally provided in a particular type of body style but some consumers desire multi-purpose vehicles that can function as a passenger vehicle and also as a cargo-carrying vehicle. One sport utility vehicle is known that has a partially retractable central roof portion. The roof has central roof panels that are retracted and stacked sequentially as they are shifted from the rear tailgate toward the front of the vehicle. This design provides an open rear portion of the vehicle while the side windows and frame members remain in place. The side portions tend to obstruct access from the sides of the vehicle to the rear cargo area of the vehicle.

There is a need for a vehicle roof system that may be simply constructed to provide either a configuration with a fully covered passenger and cargo compartment or a configuration with an open cargo compartment for hauling large items. An important factor for such a design is to allow unobstructed access to the cargo area from the side of the vehicle, as well as the rear. Another important factor for such a design is that it should be easily converted from one configuration to the other. Another important factor for such a design is that it is modular and flexible. Yet another important factor is that the design provide convenient and efficient storage for modular panels when the cargo compartment is open.

This invention is directed to solving these and other problems associated with the prior art as summarized and described below.

SUMMARY OF THE INVENTION

According to one aspect of the present invention, a retractable roof for a vehicle is provided that selectively covers a passenger/cargo compartment of the vehicle. The roof comprises a static roof section, a retractable roof section, and a retractable upper tailgate section. The retractable roof section is moved between an extended position rearward of the static roof section to a retracted position vertically stacked relative to the static roof section. The retractable upper tailgate section is moved between an extended position rearward and below the retractable roof section to a retracted position vertically stacked relative to the static roof section and the retractable roof section. Right and left side roof rail tracks extend fore-and-aft and guide movement of the retractable roof section. The retractable upper tailgate section may be moved between a rear closing position and a raised/retracted position.

According to another aspect of the invention, a retractable roof assembly for a vehicle is provided that comprises a plurality of relatively movable panels that extend laterally across the vehicle. The roof assembly also includes at least two lateral pairs of pillars and side windows disposed between a belt line of the vehicle and the roof. One pair of pillars is stationary and the other pair of pillars is movable. The windows are retractable below the belt line of the vehicle. The panels are movable relative to each other in the fore-and-aft direction. A pillar guide track is attached to an upper edge of a rear quarter window on each side of the vehicle. A follower is provided on each of the movable pillars. The followers are received by the pillar guide tracks to guide movement of the pair of movable pillars when the windows are retracted.

The above and other aspects of the invention will be better understood in view of the attached drawings and following detailed description of the illustrated embodiment of the invention.

BRIEF DESCRIPTION OF THE DRAWINGS

FIG. 1 is a fragmentary rear-side perspective view of a vehicle having a modular sliding rigid panel roof system shown in an extended position;

FIG. 2 is a rear-side perspective view of the modular sliding rigid panel roof system shown in the extended position with the rear side quarter panel windows lowered and the upper tailgate in a raised/retracted position;

FIG. 6 is a rear outer perspective view of the rear roof retractor, sunroof retractor and telescoping roof rails of the system; and FIG. 7 is a fragmentary view taken within the circle 7 of FIG. 6.

DETAILED DESCRIPTION OF THE PREFERRED EMBODIMENT(S)

Figure 3:
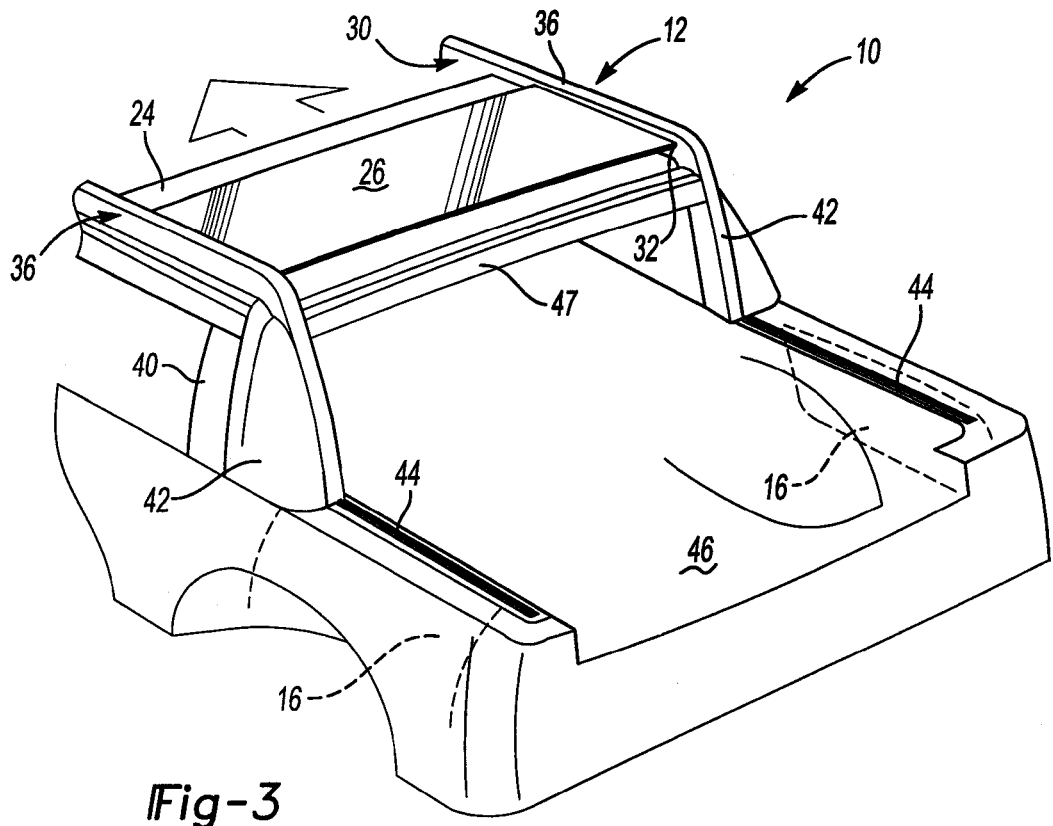
FIG. 3 is a rear-side perspective view of the modular sliding rigid panel roof system shown in a fully retracted position with retractable upper tailgate section in its raised/retracted position.

FIGS. 1-4 show the modular sliding panel roof system of the present invention in four different operational configurations that illustrate the flexibility and versatility of the system. Referring to FIG. 1, a vehicle is generally indicated by reference numeral 10 that is provided with a modular sliding panel roof system 12. A sunroof module 14 may form part of the roof assembly 12 to provide a selectively closable opening in the roof above the driver and front seat passenger. The sunroof module may be transparent or opaque. A sunroof module 14, while offering certain advantages, is not an essential part of the invention in all embodiments of the invention. The vehicle 10 is provided with retractable rear quarter windows 16 that may be retracted by a window regulator mechanism to a position within the vehicle 10.

The roof assembly module 12 includes or cooperates with a stationary panel 20. The stationary panel 20 may be part of the vehicle 10 or may be provided as part of the roof assembly module 12. A sliding panel 24, as shown in FIG. 1, is disposed rearward of the stationary panel 20. An upper tailgate section 26 is positioned below and extends generally downwardly from the rear edge of the sliding panel 24. The upper tailgate section 26 is provided on a hinge support 28. Hinge support 28 permits the upper tailgate section 26 to be pivoted to a position that is essentially coplanar with the sliding panel 24. The upper tailgate section 26 may be opened to provide access to the rear part of the vehicle 10 or may be retracted as will be described with reference to FIG. 2 below. The sliding panel 24 and upper tailgate 26 are both supported between telescoping roof rails 30. The telescoping roof rails 30 include an upper tailgate receptacle slot 32 in which the upper tailgate section 26 may be retracted. The telescoping roof rails 30 include front rails 34 and rear rails 36 that are received over the front rails 34.

The vehicle 10 includes C-pillars 40 that are stationary and disposed on opposite lateral sides of the vehicle 10. D-pillars 42 are provided on opposite lateral sides of the vehicle. The D-pillars 42 are movable from the rear end of the vehicle to a position adjacent the C-pillars 40 as will be more specifically described with reference to FIGS. 3 and 4 below.

A guide track 44 is provided on the top edge of each of the retractable rear quarter windows 16. The guide tracks 44 are raised and lowered with the windows 16. In the lowered position of the windows 16 and guide tracks 44, the guide tracks 44 may be used to guide movement of the D-pillars 42 toward and away from the C-pillars 40.

Referring to FIG. 3, the roof assembly module 12 is shown with the sliding panel 24 fully retracted over the stationary panel 20. The upper tailgate section 26 is disposed in its raised/retracted position in which it is generally coplanar with the sliding panel 24. In this position, the upper tailgate section 26 is retracted within the tailgate receptacle slot 32 that is formed in the rear portion of the rear rails 36. The windows 16 have been retracted into the vehicle 10 and the D-pillars 42 have been moved through the guide tracks 44 to a position rearward and adjacent the C-pillars 40. This exposes a cargo area 46 in the rear of the vehicle 10. Also, with the upper tailgate section 26 in its raised/retracted position, airflow is permitted through the passenger compartment from the sunroof, if provided, and also from the lowering of the passenger compartment windows.

Figure 4:
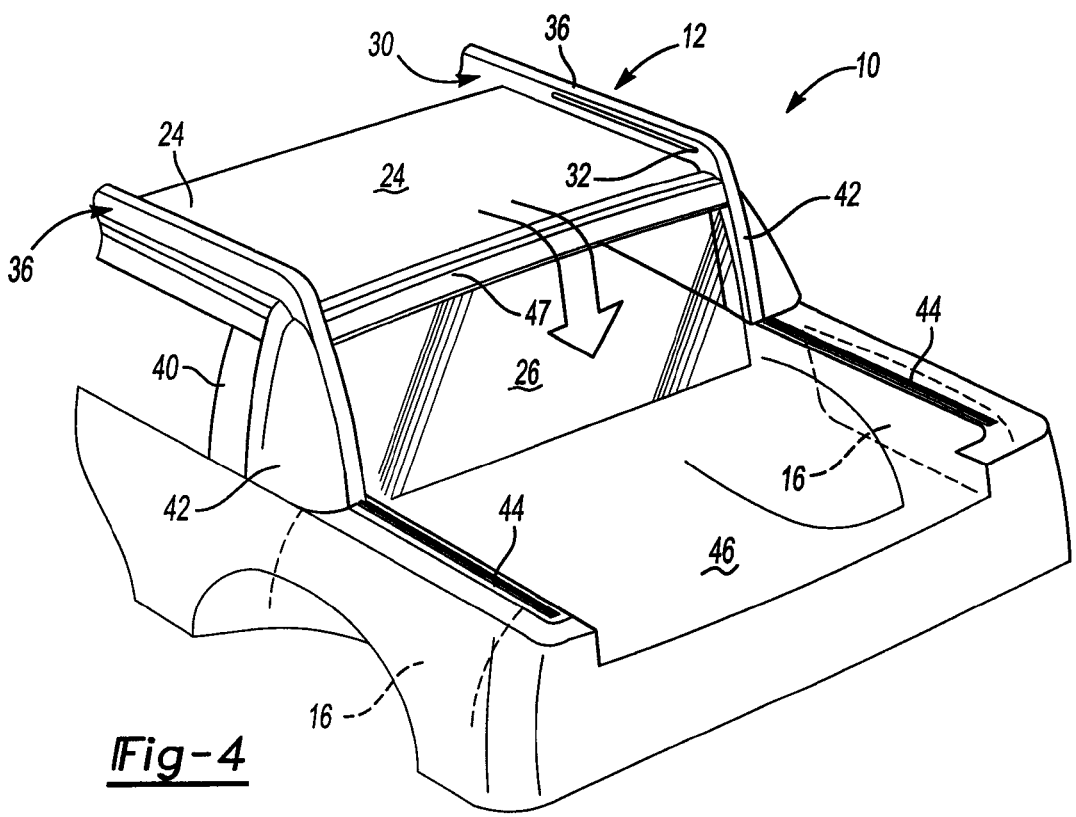
FIG. 4 is a rear-side perspective view of the modular sliding rigid panel roof system shown in the fully retracted position with the upper tailgate section in a rear closing position.

Referring to FIG. 4, the roof assembly module 12 is shown on a vehicle 10 in its fully retracted position with the sliding panel 24 and telescoping roof rails 30 in their retracted position with the sliding panel 24 being disposed over the stationary panel 20. The upper tailgate section 26 is shown in its rear closing position generally closing the space between the D-pillars 42. The gap between the stationary panel 20 and the upper tailgate section 26 is spanned by means of a fascia panel 47 and/or seals as is well known in the art. The cargo area 46 is fully exposed and accessible from the side or the rear and is a functional equivalent to a pickup truck bed. The guide tracks 44 are shown on the vehicle above the retracted window 16 and the D-pillars 42 are shown in abutment with the C-pillars 40.

Figure 5:
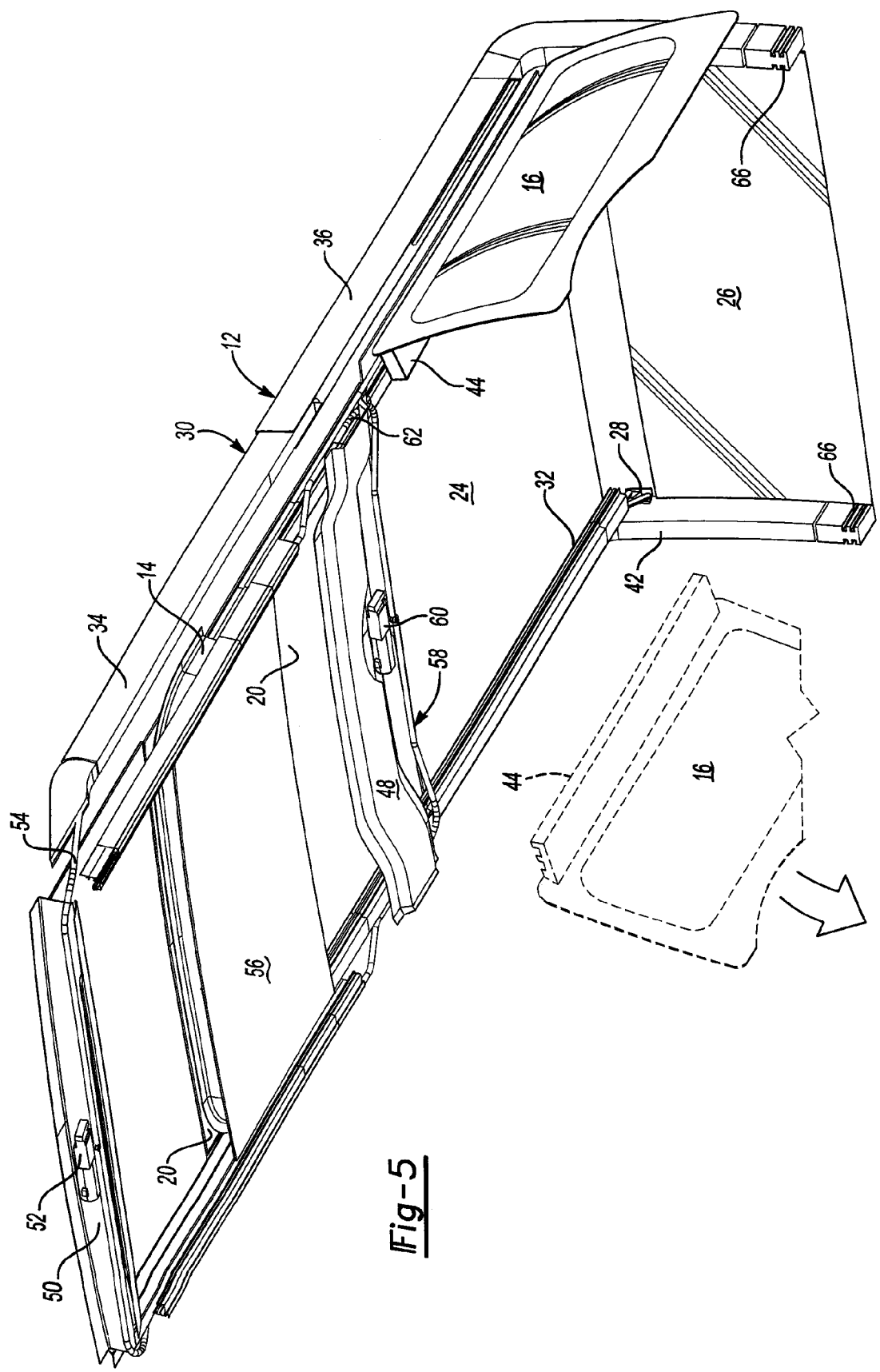
FIG. 5 is a front side inner perspective view of the modular sliding rigid panel roof system.

Referring to FIG. 5, the roof assembly module 12 is shown from an interior vehicle angle. The roof assembly module 12 is shown with the sunroof module 14 in its retracted position opening a space above the front seats of the vehicle. The sunroof module 14 retracts to a position below the stationary panel 20. A roof support bow 48 is shown extending laterally across the vehicle to provide support for the roof in the center of the vehicle 10. The upper tailgate section 26 is shown in its rear closing position between the D-pillars 42. The windows 16 are shown with one of the windows, in phantom lines, retracted and the other window in its raised position. Both windows 16 are normally either raised or lowered at the same time. The telescoping roof rails 30 are shown in their extended position with the rear rails 36 being disposed generally behind the front rails 34. A rear roof retractor system 50 is assembled to the front end of the roof assembly module 12. The rear roof retractor 50 includes a drive motor 52 that is connected by cables 54 to the sliding panel 24. The drive motor 52 extends or retracts the cables 54 (as is well known with sunroof drive systems) to move the sliding panel 24 relative to the stationary panel 20. The cables 54 may be routed generally through the telescoping roof rails 30. An inner roof panel 56 is provided below the sunroof module 14 when the sunroof is in its retracted position. The sunroof module 14 includes a sunroof retractor system that is generally indicated by reference numeral 58. The sunroof retractor system 58 includes a drive motor 60 that is connected to the sunroof module 14 by a cable 62. The sunroof retractor system 58 operates in a conventional manner that is well known in prior art sunroof retractors.

Referring to FIG. 6, selected parts of the roof assembly module 12 are shown from the rear. The telescoping roof rails 30 are shown in retracted position. The rear roof retractor 50 and sunroof retractor 58 are shown in conjunction with their respective drive motors 52, 60 and cables 54, 62. The guide tracks 44 are shown assembled to the top edge of the retractable rear quarter windows 16. The guide tracks 44 are shown in the raised position. The left side guide track 44 and window 16 are also shown in the lowered position in phantom for illustrative purposes.

Referring to FIG. 7, the structure of the guide tracks 44 used to guide movement of the D-pillars 42 is shown in greater detail wherein the guide tracks 44 are attached to the windows 16 and include tracks 64 in which a follower shoe 66 (shown at the base of the D-pillar in FIG. 6) is received for reciprocal fore-and-aft movement. A plurality of seal retainers 68 are provided on the guide tracks 44 that receive seals (not shown) that are used to establish a seal between the guide track 44 and the vehicle 10 as is well known in the art.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A retractable roof for a vehicle for covering at least part of a passenger/cargo compartment of the vehicle, the roof comprising:

a static roof section;

a right side track and a left side track that extend fore-and-aft along the roof;

a retractable roof section having a front edge and a back edge, the retractable roof section being movably attached between the right and left side tracks, the retractable roof section is moved between an extended position in which the retractable roof section is disposed rearward of the static roof section to a retracted position above the static roof section; and a retractable upper tailgate section is disposed adjacent the back edge of the retractable roof panel, the upper tailgate section having a rear closing position in which the upper tailgate section extends downwardly from the retractable roof panel and a raised/retracted position in which the upper tailgate section is behind and generally coplanar with the static roof section and the retractable roof section wherein the retractable upper tailgate section may be placed selectively in either the rear closing position or the raised/retracted position when the retractable roof section is in the retracted position.

2. The retractable roof for a vehicle of claim 1 wherein the right and left side tracks each have a forward portion that is generally disposed above the static roof section and a rearward portion that is generally disposed above the retractable roof section, wherein the forward portions and rearward portions are telescopically connected and are retracted when the retractable roof section is in the retracted position and are extended when the retractable roof section is in the extended position.

3. The retractable roof for a vehicle of claim 2 wherein the rearward portions of the right and left side tracks have a receptacle track that extends toward the forward portions in which the upper tailgate section is received when the upper tailgate section is in the raised/retracted position.

4. The retractable roof for a vehicle of claim 1 further comprising right and left C-pillars and right and left D-pillars that support the roof of the vehicle, the C-pillars extending downwardly from the location where the static roof section and retractable roof section are adjacent to one another when the retractable roof section is in its extended position, the D-pillars extending downwardly from the location where the retractable roof section and the retractable upper tailgate section are adjacent to one another when the retractable roof section is in the extended position and the retractable upper tailgate section is in the rear closing position, the D-pillars being retracted towards the C-pillars when the retractable roof section is moved to its retracted position and being moved away from the C-pillars when retractable roof section is moved to its extended position.

5. The retractable roof for a vehicle of claim 1 further comprising right and left rear quarter windows that are retracted downwardly into a right rear quarter panel and a left rear quarter panel, respectively, when the retractable roof section is moved to its retracted position.

6. The retractable roof for a vehicle of claim 1 further comprising a pillar guide track provided on a top edge of each of the rear quarter panel windows, and a follower provided on a lower end of each of the D-pillars, wherein the rear quarter windows are lowered until the pillar guide tracks are aligned with the followers on the lower ends of the D-pillars, wherein the followers may be received in the pillar guide tracks to guide the movement of the D-pillars fore-and-aft.

7. The retractable roof for a vehicle of claim 1 further comprising a sunroof that is moved between a closed position forward of and adjacent to the static roof section and an open position below the static roof section.

8. A retractable roof for a vehicle comprising:
a static roof section;
right and left telescoping side tracks that extend fore-and-aft along the roof on right and left sides of the static roof section;
a retractable roof section extending between the right and left telescoping side tracks that is moved between an extended position rearward of the static roof section to a retracted position vertically stacked above to the static roof section; and
a pair of C-pillars extending below the front end of the retractable roof section when in its extended position and a pair of D-pillars extending below a rear end of the retractable roof section, wherein the D-pillars may be retracted towards the C-pillars when the retractable roof section is moved to its retracted position and being extended away from the C-pillars when the retractable roof section is moved to its extended position.

9. The retractable roof for a vehicle of claim 8 further comprising a right rear quarter window, a left quarter panel window, a pillar guide track provided on a top edge of each of the rear quarter panel windows, and a follower provided on a lower end of each of the D-pillars, wherein the rear quarter windows are lowered until the pillar guide tracks are aligned with the followers on the lower ends of the D-pillars, wherein the followers may be received in the pillar guide tracks to guide the movement of the D-pillars fore-and-aft.

10. The retractable roof for a vehicle of claim 8 further comprising a motor disposed in a location forward of the retractable roof section when in the retracted position, and a drive system connecting the motor to the retractable roof section that drives the retractable roof section between the extended and retracted positions.

11. The retractable roof for a vehicle of claim 8 wherein a rearward portion of each of the right and left side tracks define a receptacle for receiving a back light assembly in a roof overlying position.

12. The retractable roof for a vehicle of claim 8 further comprising a sunroof that is moved between a closed position forward of and adjacent to the static roof section and an open position in which the sunroof is vertically stacked relative to the static roof section.

13. A retractable roof assembly for a vehicle having a passenger compartment, the roof assembly comprising:
a stationary pair of lateral pillars on opposite sides of the passenger compartment;
a movable pair of lateral pillars on opposite sides of the passenger compartment;
a stationary roof panel that extends laterally across the vehicle and is disposed forward of the stationary pair of the pillars;
a movable roof panel that extends laterally across the vehicle and is disposed forward of the movable pair of pillars, the movable roof panel being movable relative to the stationary roof panel in the fore-and-aft direction;
right and left telescoping guide rails disposed above the passenger compartment on laterally spaced sides of the stationary roof panel and the movable roof panel, the movable panel guide rails each being comprised of a front rail and a rear rail that are connected for telescopic relative movement;
a right pillar guide track and a left pillar guide track attached to an upper edge of a right quarter window and a left quarter window, a window regulator provided for each quarter window for raising and lowering the quarter windows, wherein the pillar guide tracks are disposed on laterally spaced sides of the vehicle at the vehicle belt line when the quarter windows are lowered;
a follower being provided on each of the movable pillars and being received by the pillar guide tracks when the quarter windows are lowered to guide movement of the movable pair of pillars between an extended position and a retracted position.

14. The retractable roof assembly of claim 13 wherein a back light is attached to a back edge of the movable roof panel, wherein the back light is movable between a window position in which the back light spans the movable pillars and is held in a slanted orientation between the belt line and the movable roof panel and a roof panel position wherein the back light is coplanar with the movable roof panel.

15. The retractable roof assembly of claim 14 wherein the back light may be selectively in either the window position or in the roof panel position when the movable pillars are in the retracted position and when the movable pillars are in the extended position.

* * * * *